(12) United States Patent
Cocchi et al.

(10) Patent No.: US 8,376,609 B2
(45) Date of Patent: Feb. 19, 2013

(54) DISPOSABLE AGITATOR FOR MIXED FOOD PRODUCTS

(75) Inventors: Gino Cocchi, Bologna (IT); Gianni Zaniboni, Borgonuovo di Sasso Marconi (IT); Roberto Lazzarini, Reggio Emilia (IT)

(73) Assignee: ALI S.p.A. (IT)

( * ) Notice: Subject to any disclaimer, the term of this patent is extended or adjusted under 35 U.S.C. 154(b) by 750 days.

(21) Appl. No.: 12/003,247

(22) Filed: Dec. 21, 2007

(65) Prior Publication Data

US 2008/0159070 A1 Jul. 3, 2008

(30) Foreign Application Priority Data

Dec. 28, 2006 (IT) ................................ BO2006A0888

(51) Int. Cl.
*A47J 43/28* (2006.01)
*B01F 15/00* (2006.01)

(52) U.S. Cl. .............................. 366/343; 30/327; 30/328

(58) Field of Classification Search .................. 366/343; 30/324, 328, 327
See application file for complete search history.

(56) References Cited

U.S. PATENT DOCUMENTS

| 1,897,809 | A | * | 2/1933 | Lilley | 30/328 |
| 2,019,566 | A | * | 11/1935 | Gray | 30/324 |
| D153,674 | S | * | 5/1949 | Erker | 30/324 |
| 2,833,576 | A | | 5/1958 | Cirone | |
| D309,399 | S | * | 7/1990 | Barnard et al. | D7/412 |
| 4,946,287 | A | * | 8/1990 | Barnard et al. | 366/343 |
| 5,112,135 | A | | 5/1992 | Rupp | |
| 6,086,240 | A | | 7/2000 | Murphy | |
| 2006/0191146 | A1 | * | 8/2006 | Chao | 30/324 |

OTHER PUBLICATIONS

European Search Report dated Jun. 8, 2011 from counterpart European patent application.

* cited by examiner

*Primary Examiner* — Walter D Griffin
*Assistant Examiner* — Timothy Cleveland
(74) *Attorney, Agent, or Firm* — Timothy J. Klima; Shuttleworth & Ingersoll, PLC

(57) ABSTRACT

The disposable agitator for mixed food products has an elongated stem, which has, at a longitudinal end, an agitator blade having the shape of a spoon, and can be removably fixed to the rotary shaft of a mixer, so that the consumer can subsequently use the agitator as a utensil for eating the product previously mixed; the agitator has at least one longitudinal rib, projecting transversally from the stem and/or from the agitator blade and at the same time acting as an agitator stiffening element and an active element in the mixing action.

7 Claims, 5 Drawing Sheets

DISPOSABLE AGITATOR FOR MIXED FOOD PRODUCTS

BACKGROUND OF THE INVENTION

The present invention relates to a disposable agitator for mixed food products, such as ice creams, frappes, milk shakes or the like, enriched with candied items, sweets, chocolates, hazelnuts, pistachios or other condiments.

In particular, the present invention relates to a disposable agitator, having the shape of a spoon, which can be removably fixed to the rotary shaft of a mixer (mixing machine), so that the consumer can subsequently use it as a utensil to eat the product previously mixed, without compromising hygiene and without having to clean the agitator between one use and the next.

An agitator of this type is known, for example, from U.S. Pat. No. 4,946,287. It is made of plastic and comprises a hollow cylindrical elongated stem, closed at a free longitudinal end by an agitator blade which has the shape of a spoon.

The stem can be coupled by means of a snap on action to the rotary shaft of the mixer by means of axial sliding which results in the stem being fortified by the shaft inside its cavity.

In this way the stem, as well as being stiffened by the shaft, protects the latter from contamination which could arise from contact with different types of product. Once the ice cream or the like has been mixed with the respective condiment, the stem can easily be removed from the shaft to act as a handle in the subsequent use of the agitator as a utensil for eating the product.

In the agitator described above the simple spoon shape of the agitator blade does not guarantee satisfactory mixing of the products unless at relatively high shaft rotation speeds.

On one hand this may result in unwanted splashes of product on or around the mixer, and on the other hand it may break product the whipping bonds, in particular in the case of so-called soft ice creams which, if subjected to mixing that is too fast, tend to partly return to the liquid or semi-liquid phase.

SUMMARY OF THE INVENTION

The present invention has for an aim to provide a disposable agitator for mixed food products which can guarantee the mixing quality required whilst mixing the products at a lower speed of rotation.

The present invention also has for an aim to provide a disposable agitator for mixed food products which is economical enough to be thrown away after use and, at the same time, is strong enough to be able to mix even relatively pasty products without breaking.

The present invention also has for an aim to provide a disposable agitator for mixed food products that can also be coupled to mixers already on sale without requiring modifications.

Accordingly, the present invention provides a disposable agitator for mixed food products comprising the features described in any of the claims herein.

BRIEF DESCRIPTION OF THE DRAWINGS

The present invention is now described, by way of example and without limiting the scope of application, with reference to the accompanying drawings, in which.

DESCRIPTION OF THE PREFERRED EMBODIMENTS

Figure 1:
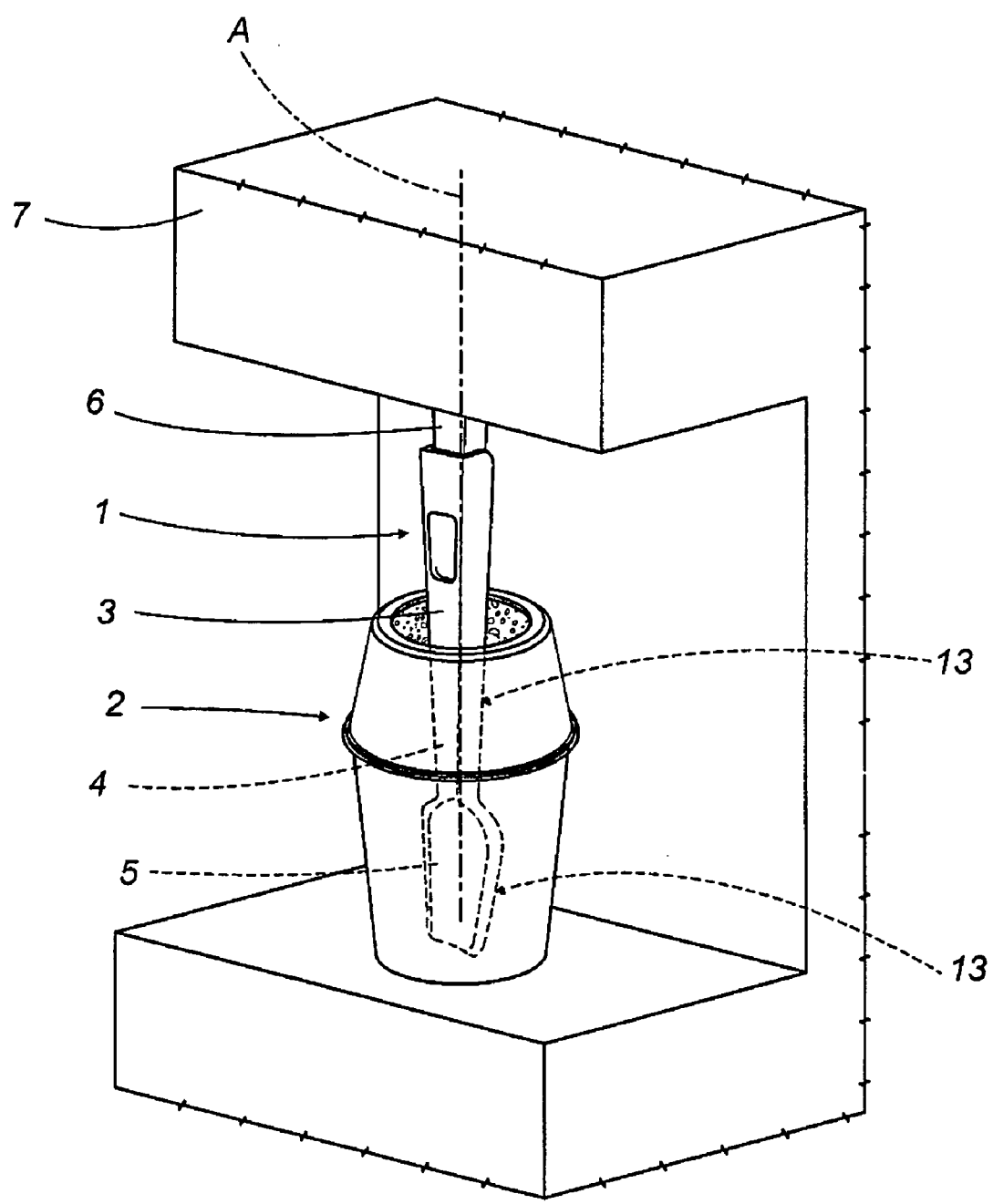
FIG. 1 is a perspective view of a mixer equipped with a disposable agitator made in accordance with the present invention.

With reference to FIGS. 1 to 4, the numeral 1 denotes a disposable agitator for mixed food products, such as ice creams, frappes, milk shakes or the like, enriched with candied items, sweets, chocolates, hazelnuts, pistachios or other condiments. Such products, and the relative condiments, are contained in a cup, also disposable, labeled 2 in FIG. 1.

The agitator 1 has a central longitudinal axis A, is completely made of plastic and comprises, in a single body obtained by molding, a stem 3, extending in the direction of the axis A and bearing, at a longitudinal end 4, an agitator blade 5 having the shape of a spoon.

Figure 2:
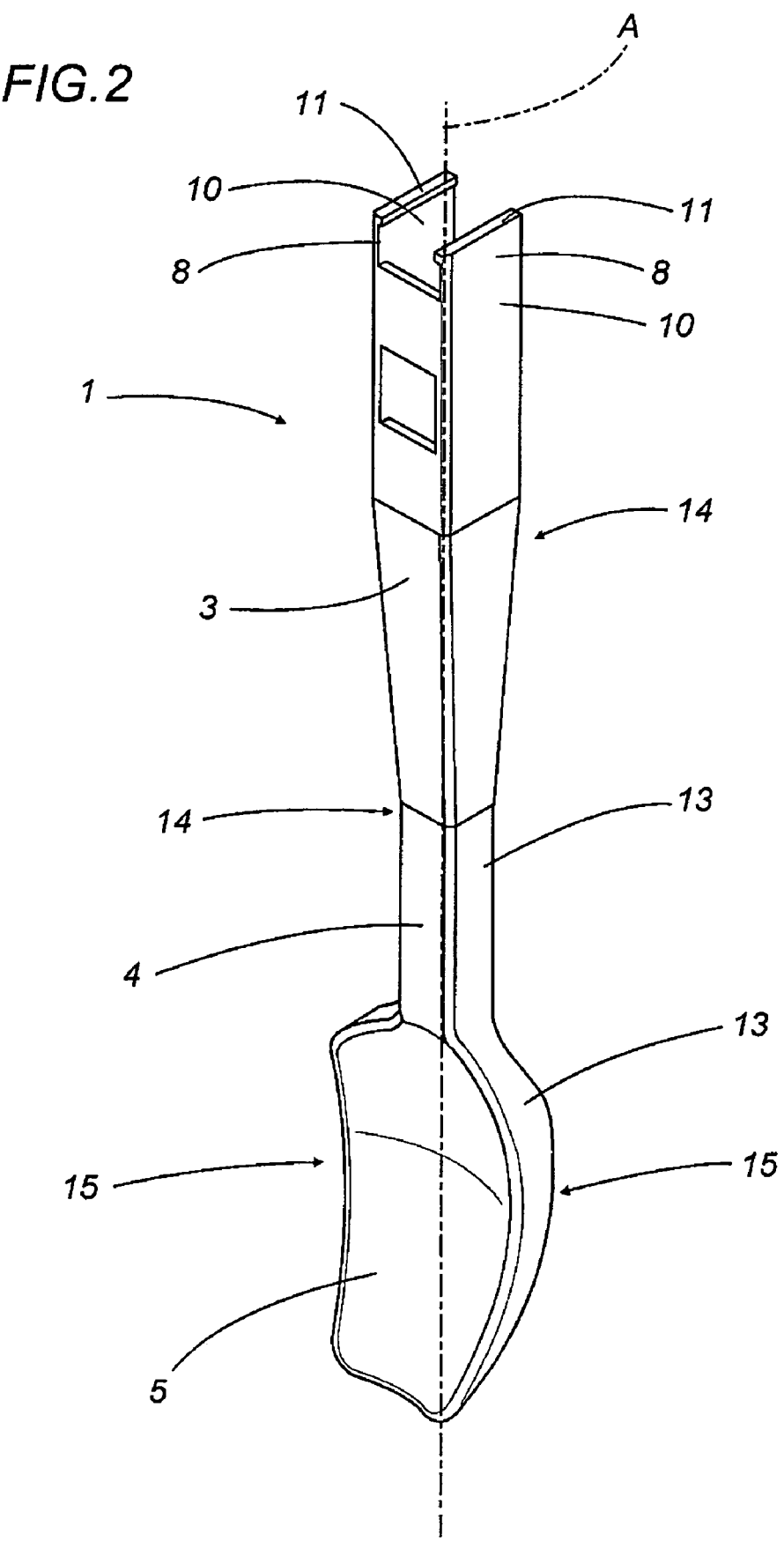
FIGS. 2 and 3 are respectively a front and a rear perspective view of the agitator of FIG. 1.

At the opposite end to the agitator blade 5, the agitator 1 can be fixed coaxially and removably to the vertical rotary shaft 6 of a mixer 7, illustrated in FIG. 1, in such a way that the consumer can subsequently use the agitator 1 as a utensil to eat the product previously mixed. In particular, as FIGS. 2, 3 and 4 show more clearly, at the opposite end to the agitator blade 5, the stem 3 has two end jaws 8, designed to removably engage with a free end portion 9 of the shaft 6.

Figure 4:
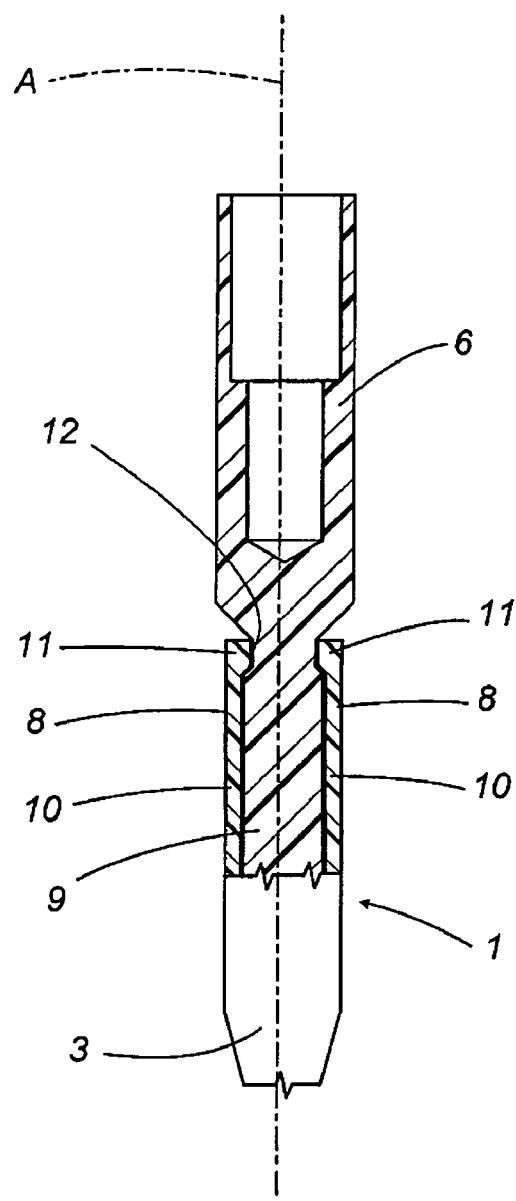
FIG. 4 is a cross-section of a detail relative to the zone where the mixer rotary shaft is coupled with the agitator of FIG. 1.

More precisely, the jaws 8 are formed by two respective rectangular flat walls 10, extending in the direction of the axis A, which are opposite and parallel with one another, each having at its free end a tooth 11, transversal to the axis A, for engaging with a transversal annular groove 12 of the abovementioned free end portion 9 of the shaft 6 (FIG. 4).

The walls 10 are positioned parallel with an agitator 1 plane of symmetry, passing through the axis A.

Figure 3:
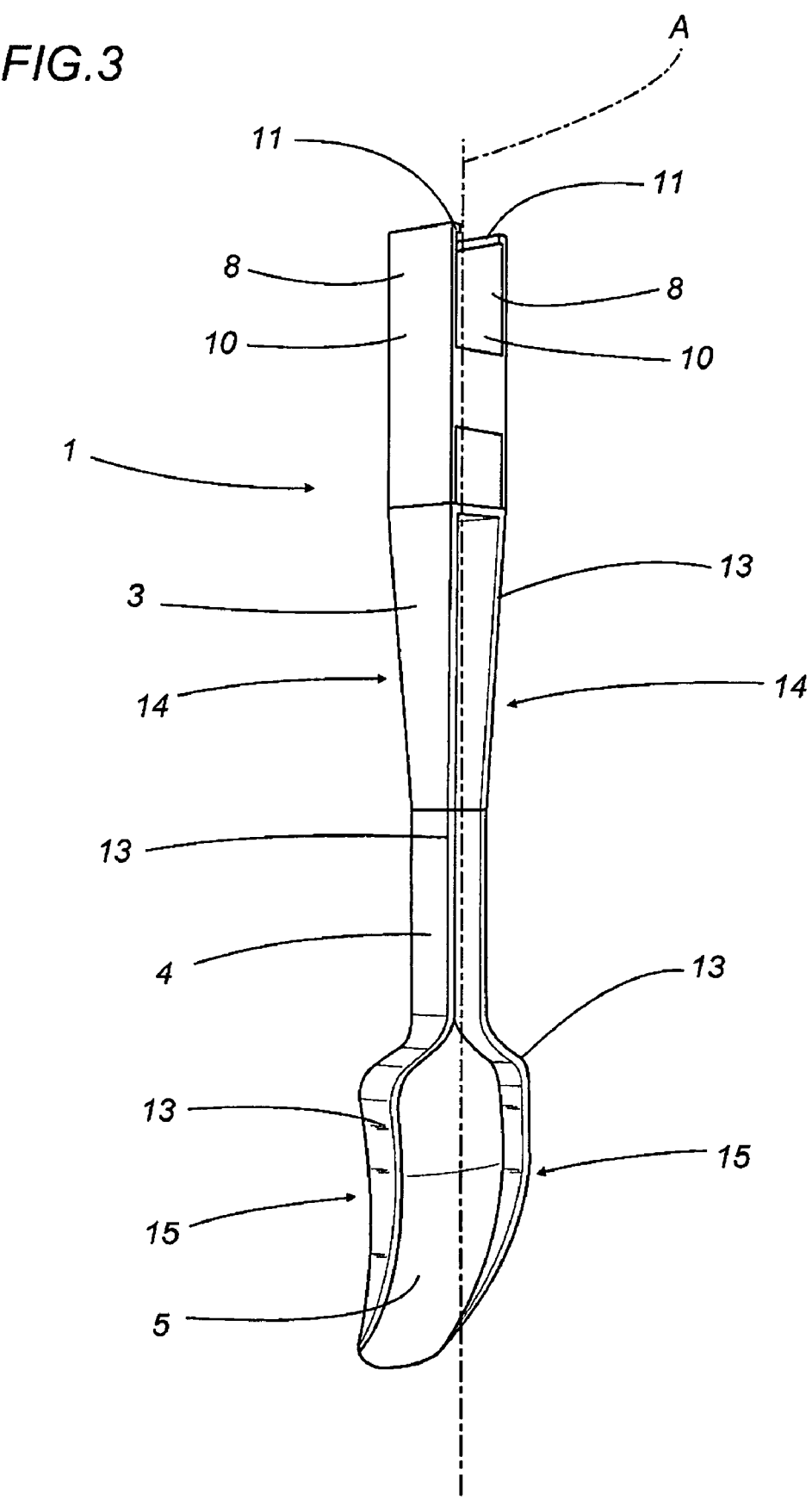

As FIG. 3 more clearly shows, the agitator 1 comprises two longitudinal projections 13 projecting transversally from the stem 3 and from the agitator blade 5, at a right angle towards the back of the agitator 1, at least partly following its contour. More precisely, each rib 13 extends in the form of a flange both along a respective side 14 of the stem 3 and, continuously, along a respective side 15 of the agitator blade 5, and acts both as a stiffening element for the agitator 1 and as an active element, that is to say as a blade, in the mixing action.

The projections 13 give the stem 3, at an end portion of it adjacent to the agitator blade 5, a channel shape, transversally C-shaped.

According to alternative embodiments of the agitator 1, not illustrated, each longitudinal rib 13 extends only along the respective side 14, or only along the respective side 15.

According to another alternative embodiment, not illustrated, the agitator 1 has a single rib 13, positioned like one of the two projections 13 described above, or centrally in a symmetrical position along the above-mentioned agitator 1 plane of symmetry.

Figure 6:
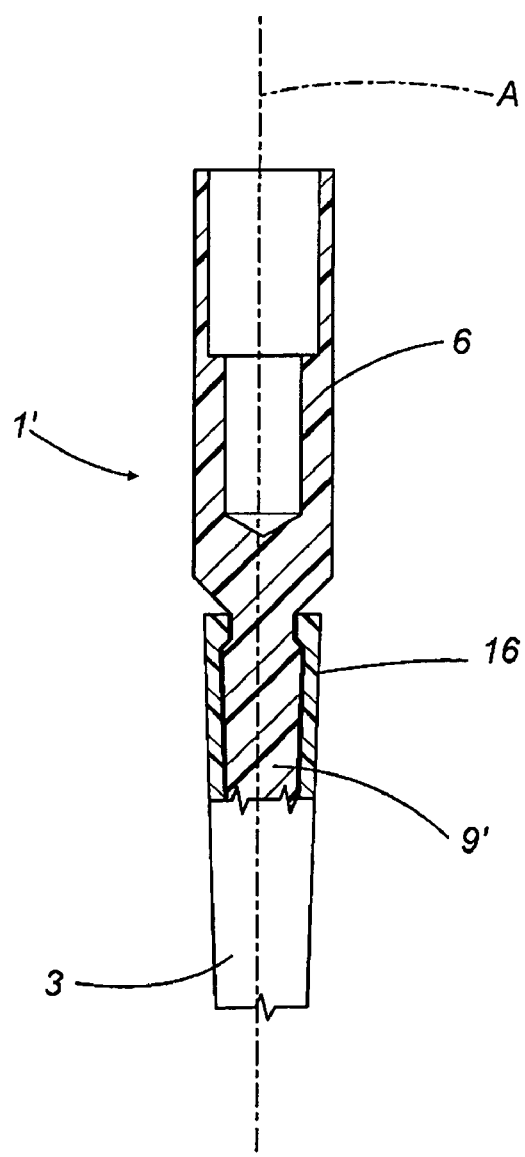
FIG. 6 is a cross-section of a detail relative to the zone where the agitator of FIG. 5 is coupled to the rotary shaft of a respective mixer.
Figure 5:
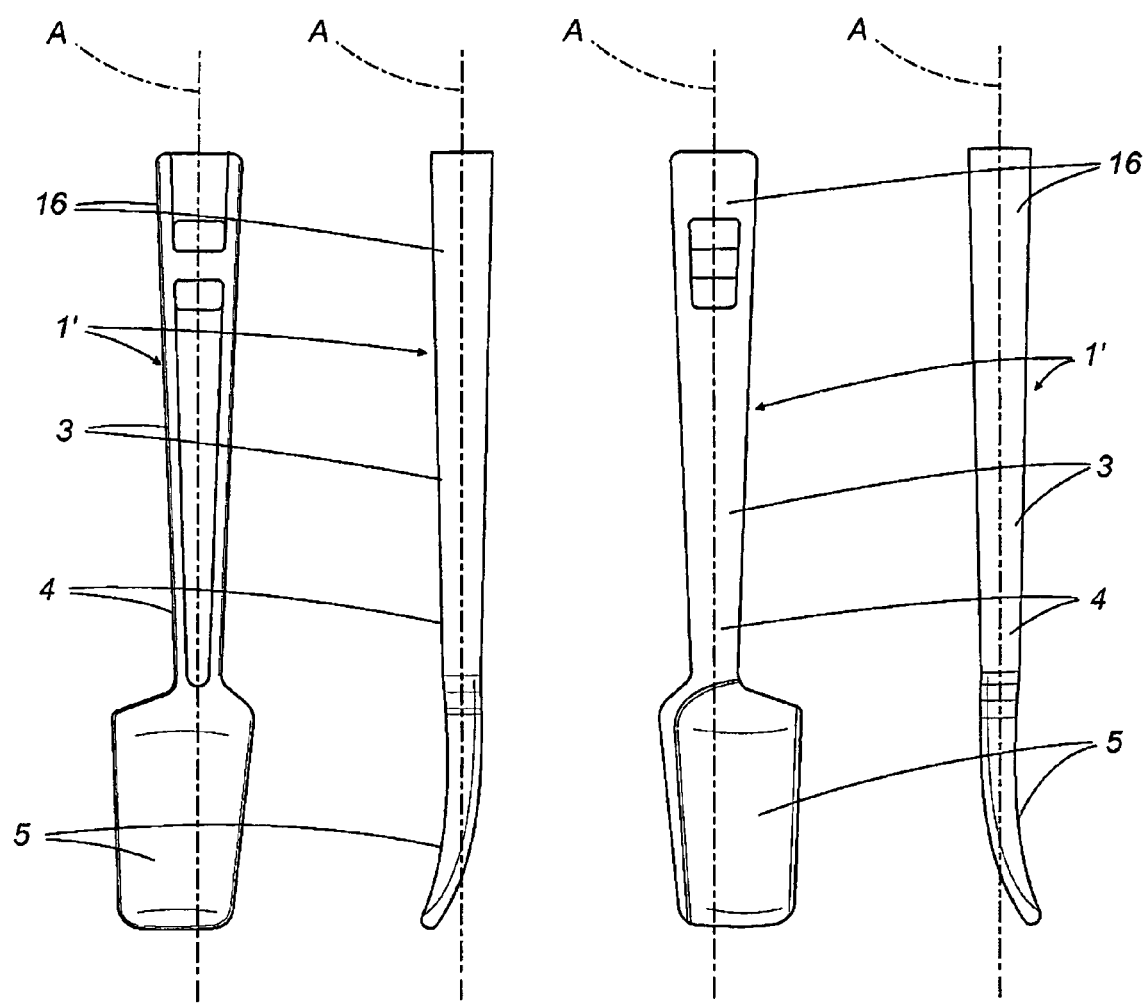
FIG. 5 shows front, side and rear views of a second embodiment of the disposable agitator in accordance with the present invention.

According to the alternative embodiment 1' illustrated in FIGS. 5 and 6, the agitator blade 5 is asymmetrical relative to any plane passing through the axis A, since it is designed for use as a spoon expressly with the right hand. Obviously, according to an alternative embodiment not illustrated, the above-mentioned asymmetry may be adapted for left-handed people.

Moreover, in the alternative embodiment 1', the projections 13 are only relative to the stem 3 and the latter has a tapered shape, with the projections 13 converging with one another towards the agitator blade 5. In particular, at the opposite end to the agitator blade 5, the stem 3 has a substantially tapered wall 16, designed to removably engage, by means of a snap on action, with a substantially tapered free end portion 9' of the mixer 7 rotary shaft 6.

Obviously, the invention described above achieves the preset aims and it may be modified and adapted in several ways without thereby departing from the scope of the inventive concept indicated in the claims herein. Moreover, all details of the invention may be substituted by technically equivalent elements.

The agitator disclosed clearly guarantees satisfactory product mixing at shaft speeds of rotation relatively lower than those of the prior art, consequently avoiding the problems linked to operator safety and the breaking of product whipping bonds.

Moreover, according to an embodiment not illustrated the stem 3 and the agitator blade 5 may be made in a solid body.

What is claimed is:

1. A disposable agitator for mixed food products, the agitator comprising an elongated stem, which has, at a longitudinal end, an agitator blade having a spoon shape, the agitator being removably fixable to a rotary shaft of a mixer, so that a consumer can subsequently use the agitator as a utensil for eating the product previously mixed; the agitator comprising two longitudinally extending ribs, projecting transversally from and running along a majority of length of the stem and a majority of length of the spoon shaped agitator blade, the two longitudinally extending ribs extending toward a rear of the agitator with an open space therebetween such that both the stem and the spoon shaped agitator blade each has an open to the rear c-shaped cross-section along a majority of its length; the ribs acting both as agitator stiffening elements and active mixing elements, the rear of the agitator being a side of the agitator where the spoon shaped agitator blade has a convex shape.

2. The agitator according to claim 1, wherein the ribs at least partly following a contour of the stem and agitator blade.

3. The agitator according to claim 1, wherein the stem has an end portion, adjacent to the agitator blade, which is transversally C-shaped.

4. The agitator according to claim 1, wherein, at an opposite end to the agitator blade, the stem has two jaws to removably engage with a free end portion of the rotary shaft.

5. The agitator according to claim 4, wherein the jaws are shaped to engage with a transversal groove of the free end portion.

6. The agitator according to claim 1, wherein, at an opposite end to the agitator blade, the stem has a substantially tapered wall designed to removably engage, by a snap on action, with a substantially tapered free end portion of the rotary shaft.

7. The agitator according to claim 1, wherein the stem and the agitator blade are a solid body.

* * * * *